United States Patent
Noor et al.

(10) Patent No.: US 12,140,334 B2
(45) Date of Patent: Nov. 12, 2024

(54) SYSTEMS AND METHODS FOR COMMUNICATION IN HVAC SYSTEM

(71) Applicant: Johnson Controls Technology Company, Auburn Hills, MI (US)

(72) Inventors: Aneek M. Noor, Wichita, KS (US);
Shawn A. Hern, Derby, KS (US);
Tyler P. McCune, El Dorado, KS (US);
Cody J. Kaiser, Wichita, KS (US);
Jeremy R. Smith, Park City, KS (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 788 days.

(21) Appl. No.: 16/833,000

(22) Filed: Mar. 27, 2020

(65) Prior Publication Data
US 2021/0302055 A1    Sep. 30, 2021

(51) Int. Cl.
*F24F 11/871*    (2018.01)
*F24F 11/41*    (2018.01)
*F24F 11/49*    (2018.01)
*F24F 11/65*    (2018.01)
*F24F 120/20*    (2018.01)
*F24F 140/00*    (2018.01)

(52) U.S. Cl.
CPC ............ *F24F 11/871* (2018.01); *F24F 11/41* (2018.01); *F24F 11/49* (2018.01); *F24F 11/65* (2018.01); *F24F 2120/20* (2018.01); *F24F 2140/00* (2018.01)

(58) Field of Classification Search
CPC .. F24F 11/38; F24F 11/41; F24F 11/49; F24F 11/65; F24F 11/871; F24F 2120/20; F24F 2140/00; F25B 2313/0294; F25B 2600/021; F25B 2700/1931; F25B 2700/1933; F25B 2700/195; F25B 2700/197; F25B 49/005; F25B 49/02; Y02B 30/70
See application file for complete search history.

(56) References Cited

U.S. PATENT DOCUMENTS

| | | | |
|---|---|---|---|
| 6,220,043 B1 * | 4/2001 | Chaney, Jr. | ........... F25B 29/003 62/158 |
| 7,748,225 B2 | 7/2010 | Butler et al. | |
| 9,562,710 B2 | 2/2017 | Pham et al. | |

(Continued)

FOREIGN PATENT DOCUMENTS

| | | |
|---|---|---|
| CN | 105650827 B | 6/2016 |
| CN | 105864964 A | 8/2016 |

(Continued)

*Primary Examiner* — Kenneth M Lo
*Assistant Examiner* — Tameem D Siddiquee
(74) *Attorney, Agent, or Firm* — Fletcher Yoder, P.C.

(57) ABSTRACT

A heating, ventilation, and/or air conditioning (HVAC) system includes a compressor, a fan, an inverter configured to drive operation of the compressor, and a controller communicatively coupled to the fan and the inverter. The controller includes a tangible, non-transitory, computer-readable medium with computer-executable instructions that, when executed by processor circuitry, are configured to cause the processor circuitry to determine an operating parameter of the fan in response to an interruption in receiving communication signals from the inverter and operate the fan based on the operating parameter during the interruption.

25 Claims, 9 Drawing Sheets

(56) References Cited

U.S. PATENT DOCUMENTS

| | | | |
|---|---|---|---|
| 2003/0234630 A1* | 12/2003 | Blake | H05K 7/20209 |
| | | | 318/471 |
| 2009/0160378 A1* | 6/2009 | Hwang | F24F 11/83 |
| | | | 318/400.3 |
| 2009/0324428 A1* | 12/2009 | Tolbert, Jr. | F04B 39/0207 |
| | | | 417/44.1 |
| 2012/0234030 A1* | 9/2012 | Hagita | F25B 49/025 |
| | | | 62/129 |
| 2014/0105757 A1* | 4/2014 | Maass | H02M 3/00 |
| | | | 417/44.1 |
| 2015/0276266 A1* | 10/2015 | Warren | F24D 19/1081 |
| | | | 700/300 |
| 2016/0357194 A1* | 12/2016 | Cheong | H04L 67/125 |
| 2018/0006758 A1* | 1/2018 | Filson | H04K 3/22 |
| 2018/0031266 A1* | 2/2018 | Atchison | F24F 11/30 |

FOREIGN PATENT DOCUMENTS

| | | |
|---|---|---|
| CN | 106524392 B | 3/2017 |
| KR | 101954152 B1 | 3/2019 |
| WO | 2016017005 A1 | 2/2016 |

\* cited by examiner

SYSTEMS AND METHODS FOR COMMUNICATION IN HVAC SYSTEM

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control the environmental properties through control of a supply air flow delivered to the environment. For example, the HVAC system may place the supply air flow in a heat exchange relationship with a refrigerant of a vapor compression circuit to condition the supply air flow. The HVAC system may condition the supply air flow based on communication between various components of the HVAC system, such as to control the operation of one of such components. However, in some circumstances, a component of the HVAC system may not effectively communicate with another component of the HVAC system. As a result, the HVAC system may not properly operate to condition the supply air flow.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating, ventilation, and/or air conditioning (HVAC) system includes a compressor, a fan, an inverter configured to drive operation of the compressor, and a controller communicatively coupled to the fan and the inverter. The controller includes a tangible, non-transitory, computer-readable medium with computer-executable instructions that, when executed by processor circuitry, are configured to cause the processor circuitry to determine an operating parameter of the fan in response to an interruption in receiving communication signals from the inverter and operate the fan based on the operating parameter during the interruption.

In one embodiment, a tangible, non-transitory, computer-readable medium with computer-executable instructions that, when executed by processor circuitry, are configured to cause the processor circuitry to determine an operating parameter of a compressor and/or a fan of a heating, ventilation, and/or air conditioning (HVAC) system in response to an interruption in receiving communication signals from a thermostat of the HVAC system and operate the compressor and/or fan based on the operating parameter during the interruption.

In one embodiment, a non-transitory computer-readable medium includes computer-executable instructions that, when executed by processor circuitry, are configured to cause the processor circuitry to determine a first operating parameter of a fan of a heating, ventilation, and/or air conditioning (HVAC) system in response to a first interruption in receiving first communication signals from an inverter of the HVAC system, in which the inverter is configured to drive operation of a compressor of the HVAC system, and operate the fan based on the first operating parameter during the first interruption. The instructions, when executed by the processor circuitry, are also configured to cause the processor circuitry to determine a second operating parameter of the compressor and/or the fan of the HVAC system in response to a second interruption in receiving second communication signals from a thermostat of the HVAC system and operate the compressor and/or the fan based on the second operating parameter during the second interruption.

DRAWINGS

Various aspects of this disclosure may be better understood upon reading the following detailed description and upon reference to the drawings in which.

Figure 8:
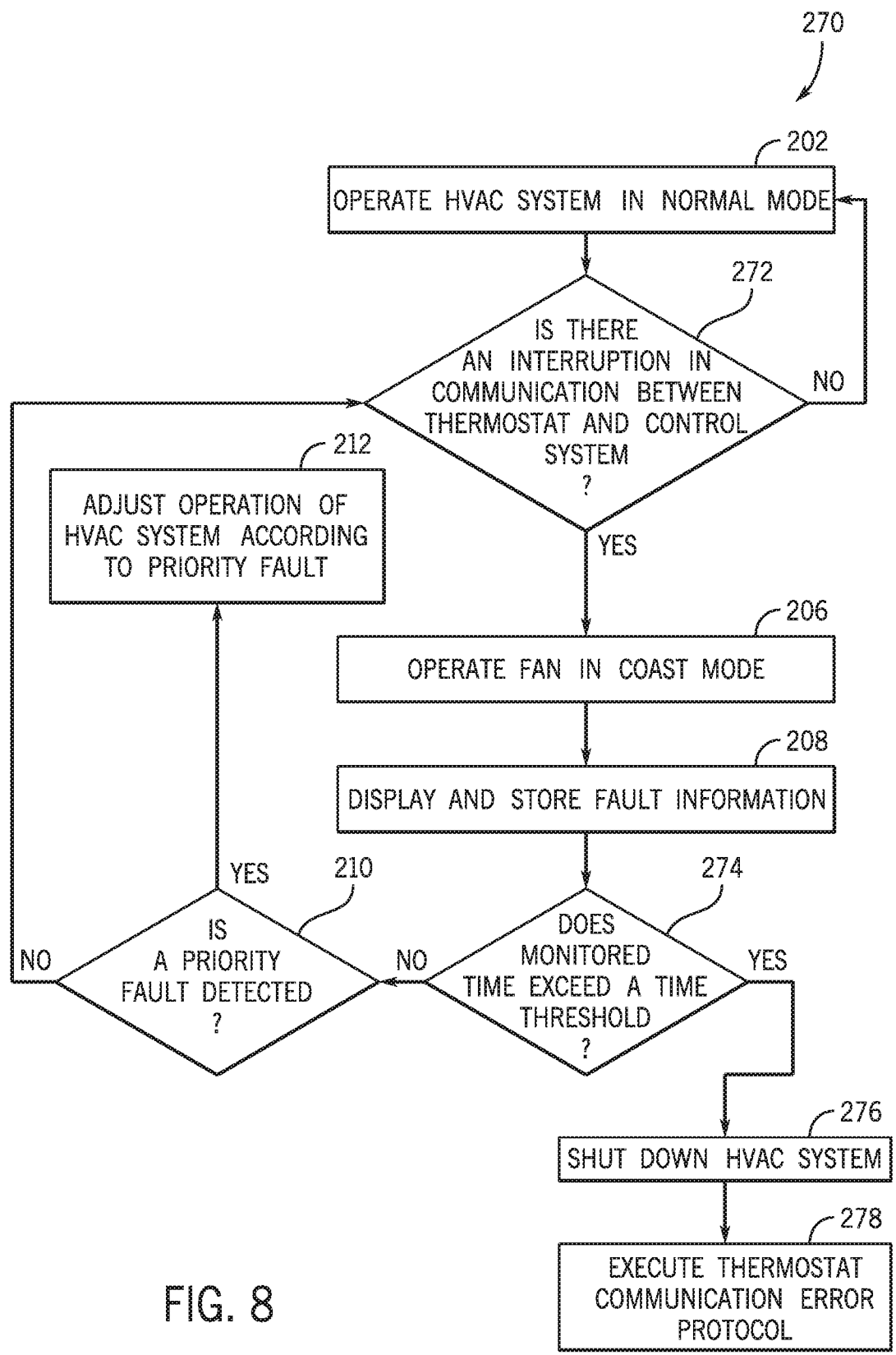
Figure 9:
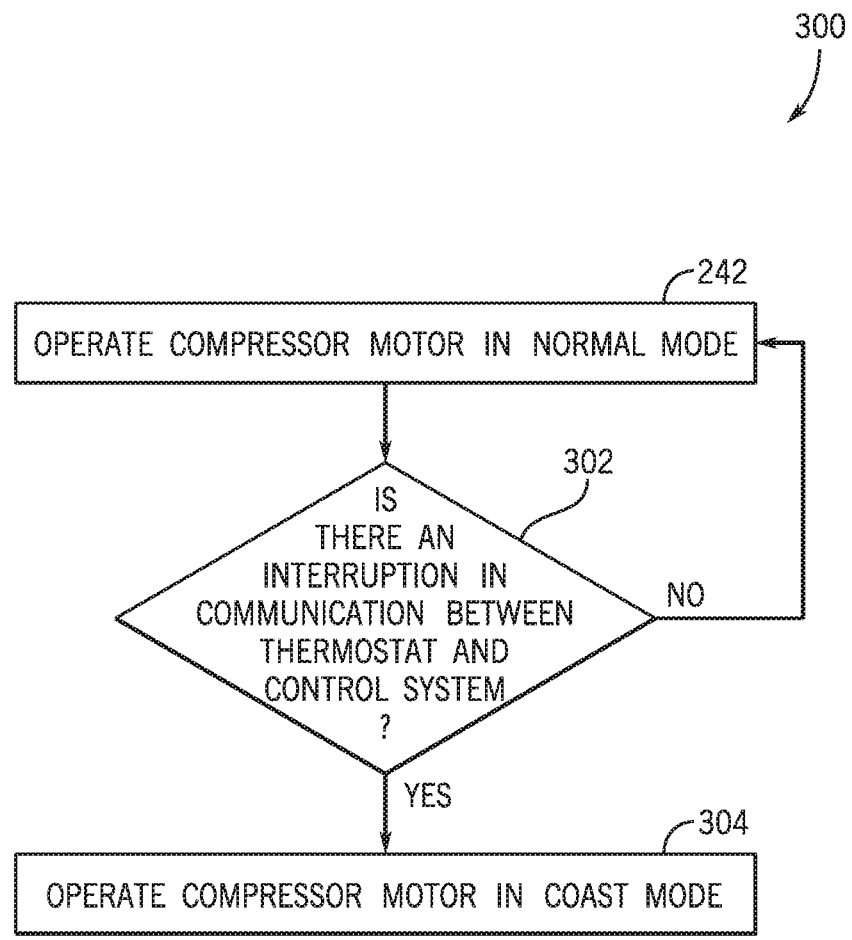

FIG. 8 is a flowchart of an embodiment of a method or process for operating an HVAC system when there is an interruption in communication between a thermostat and a control system, in accordance with an aspect of the present disclosure; and FIG. 9 is a flowchart of an embodiment of a method or process for operating a compressor when there is an interruption in communication between a thermostat and a control system, in accordance with an aspect of the present disclosure.

DETAILED DESCRIPTION

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system configured to condition an air flow. The HVAC system may include multiple components configured to communicate with one another to enable the HVAC system to operate effectively. For example, the HVAC system may include a control system communicatively coupled to a motor, which may drive operation of a compressor or of a fan. The control system may operate the motor in a particular operating mode, such as based on an operating parameter, such as a target temperature of the air flow, a current temperature of the air flow, and so forth, in order to condition the air flow to a desirable or comfortable level. In some embodiments, the HVAC system may operate in a cooling mode to reduce the temperature of the air flow and/or a heating mode to increase the temperature of the air flow. Additionally or alternatively, the HVAC system may operate in a defrost mode to increase a temperature of a component, such as a heat exchanger coil, of the HVAC system.

However, in some circumstances, certain components of the HVAC system may not be effectively communicating with one another. As an example, wiring between the control system and a thermostat may not be adequately secured and therefore, the thermostat may not transmit communication signals to the control system. In such circumstances, the control system may not receive an operating parameter from the thermostat that is typically used for operating the HVAC system effectively, such as to set the operation of the motor. Additionally or alternatively, the control system and the may not transmit communication signals to one another. As such, the control system may not set the operation of the motor and/or another component, such as a fan, of the HVAC system to operate and condition the air flow. In any case, the control system may not be able to operate other components effectively to enable the HVAC system to condition the air flow to a desirable temperature. As a result, the operation of the HVAC system may be disabled or suspended.

Thus, it is presently recognized that it is desirable for the HVAC system to operate to condition the air flow effectively even when components of the HVAC system are not effectively communicating with one another so as to maintain desirable performance of the HVAC system and/or to avoid suspension of the HVAC system operation. Accordingly, embodiments of the present disclosure are directed to systems and methods for operating the HVAC system components in certain modes when the components are not communicating with one another. As an example, the control system may continue to operate the motor or other components of the HVAC system in a predetermined operating mode, such as at a predetermined speed. In this manner, the HVAC system may continue to operate and condition the air flow at times when communication between components is irregular or unavailable.

Figure 1:
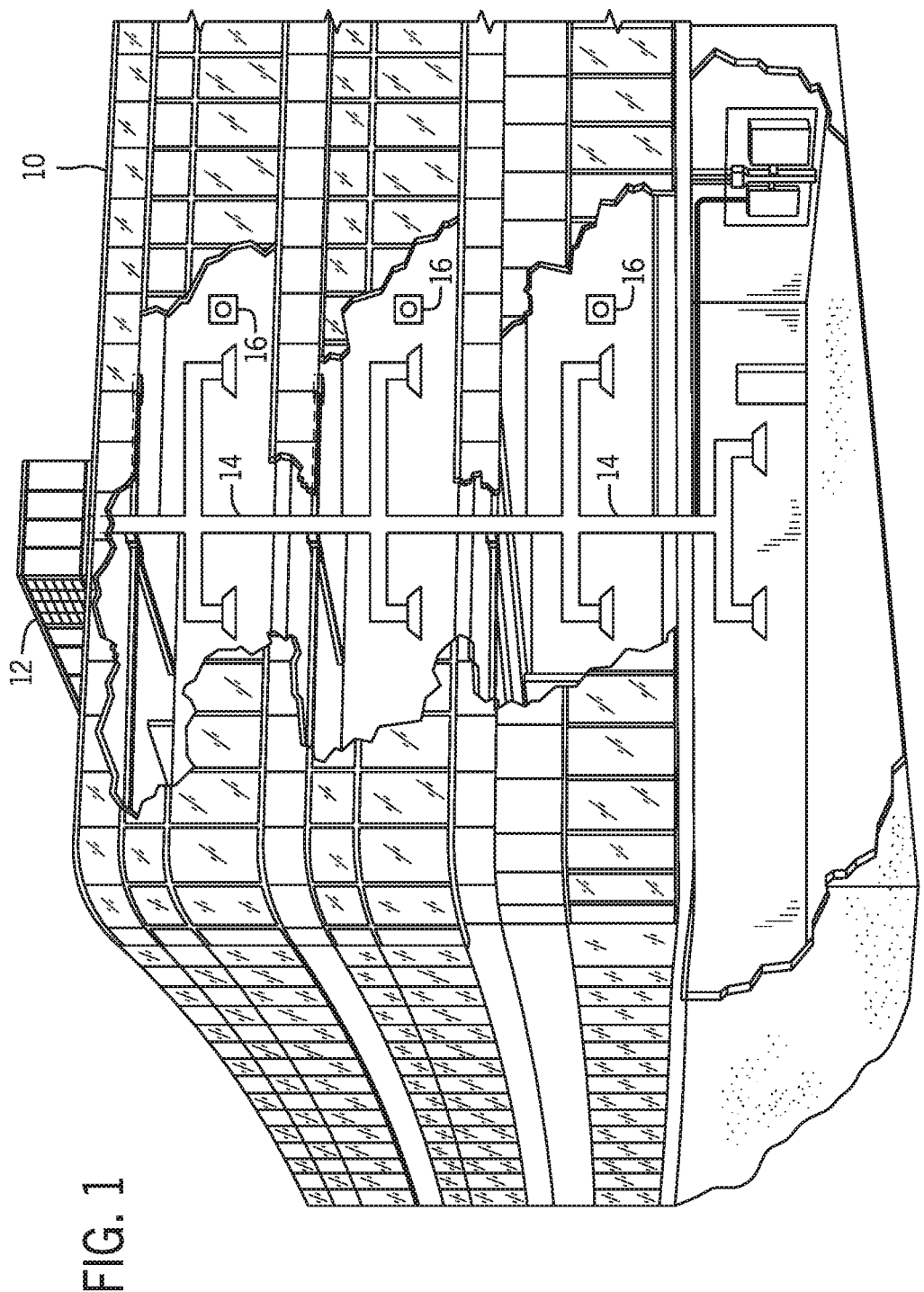
FIG. 1 is a perspective view of an embodiment of a heating, ventilation, and/or air conditioning (HVAC) system for environmental management that may employ one or more HVAC units, in accordance with an aspect of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
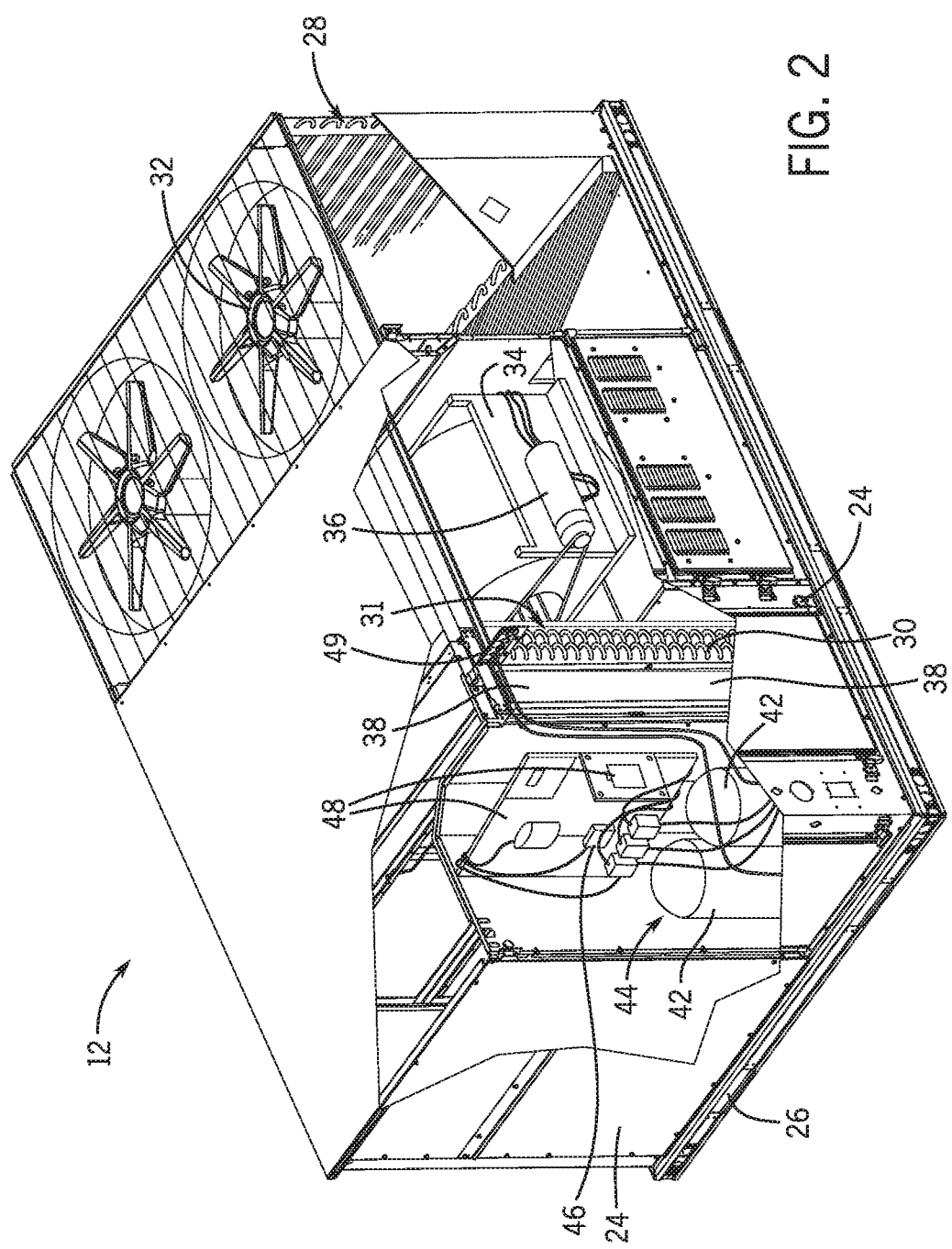
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
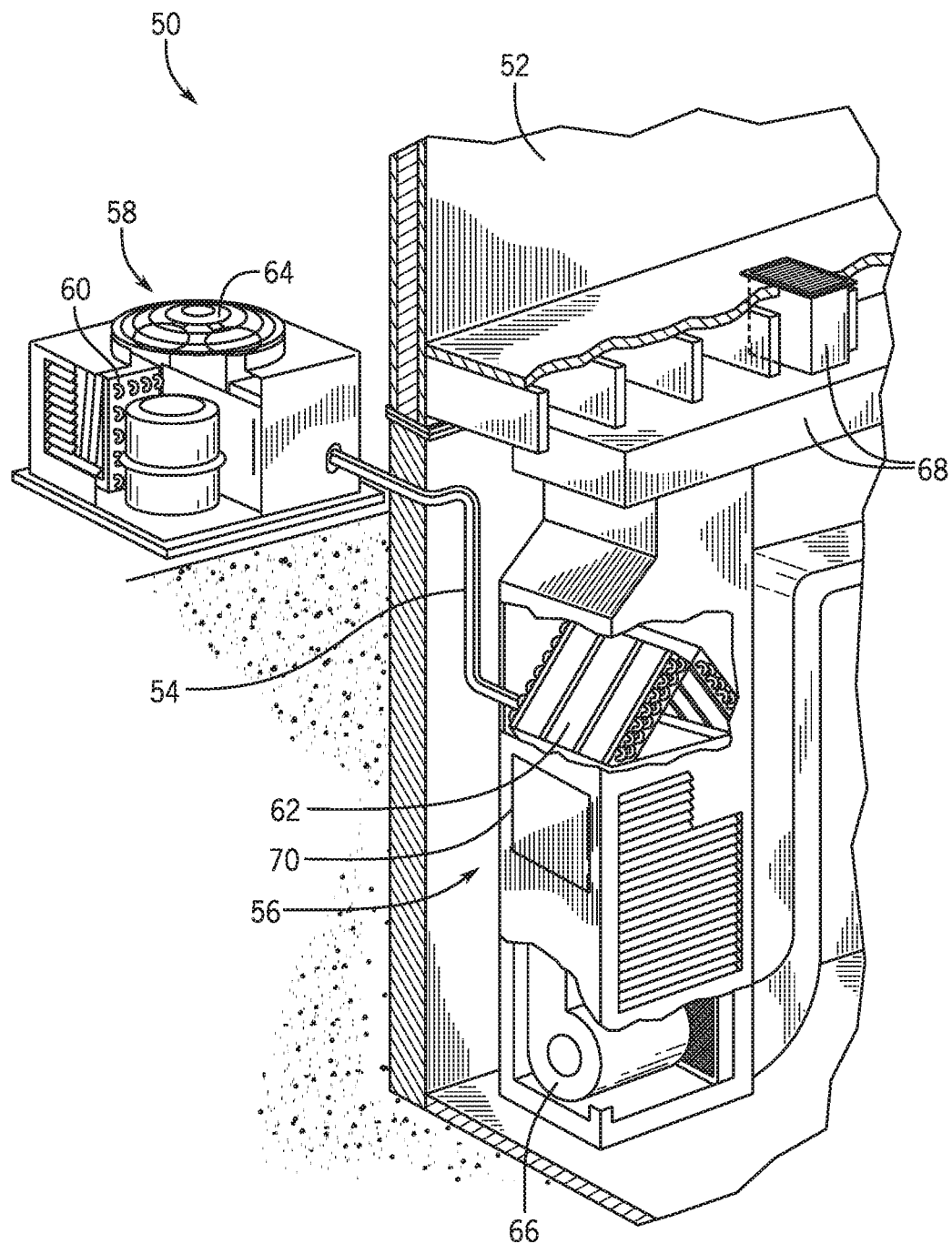
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
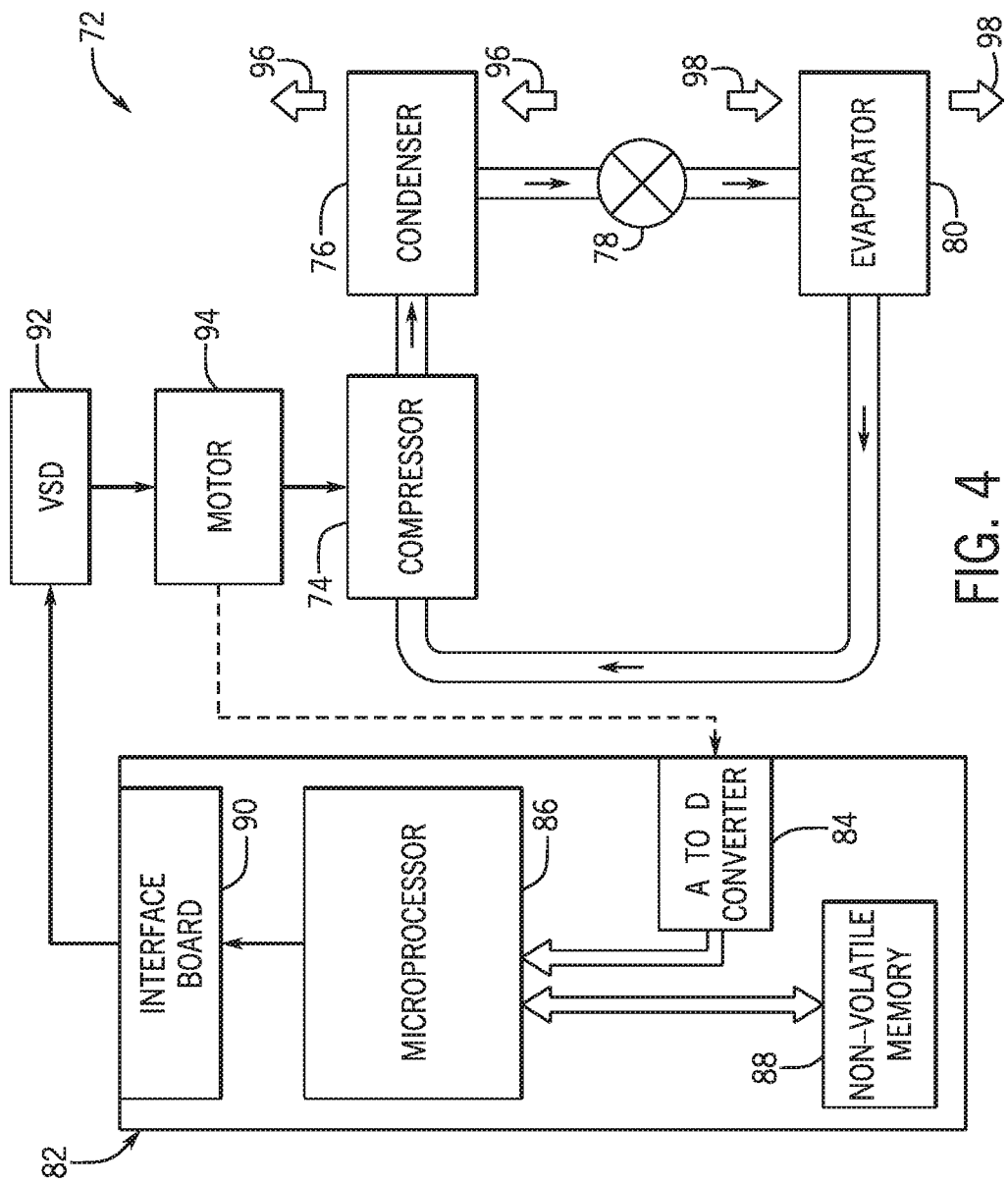
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The present disclosure is directed to an HVAC system configured to operate when certain components are not in communication with one another and are not able to regularly control or adjust operating modes, for example. In some embodiments, components of the HVAC system may continue to operate in a predetermined operating mode when a determination is made that certain components are not able to transmit communication signals to one another. By way of example, a control system of the HVAC system may continue to operate a fan motor at a current operating speed. In this way, the components of the HVAC system remain in operation to condition an air flow and a structure serviced by the HVAC system during periods of irregular component communication. As a result, the HVAC system may continue to condition the space even when some components of the HVAC system are not able to communicate with one another.

Figure 5:
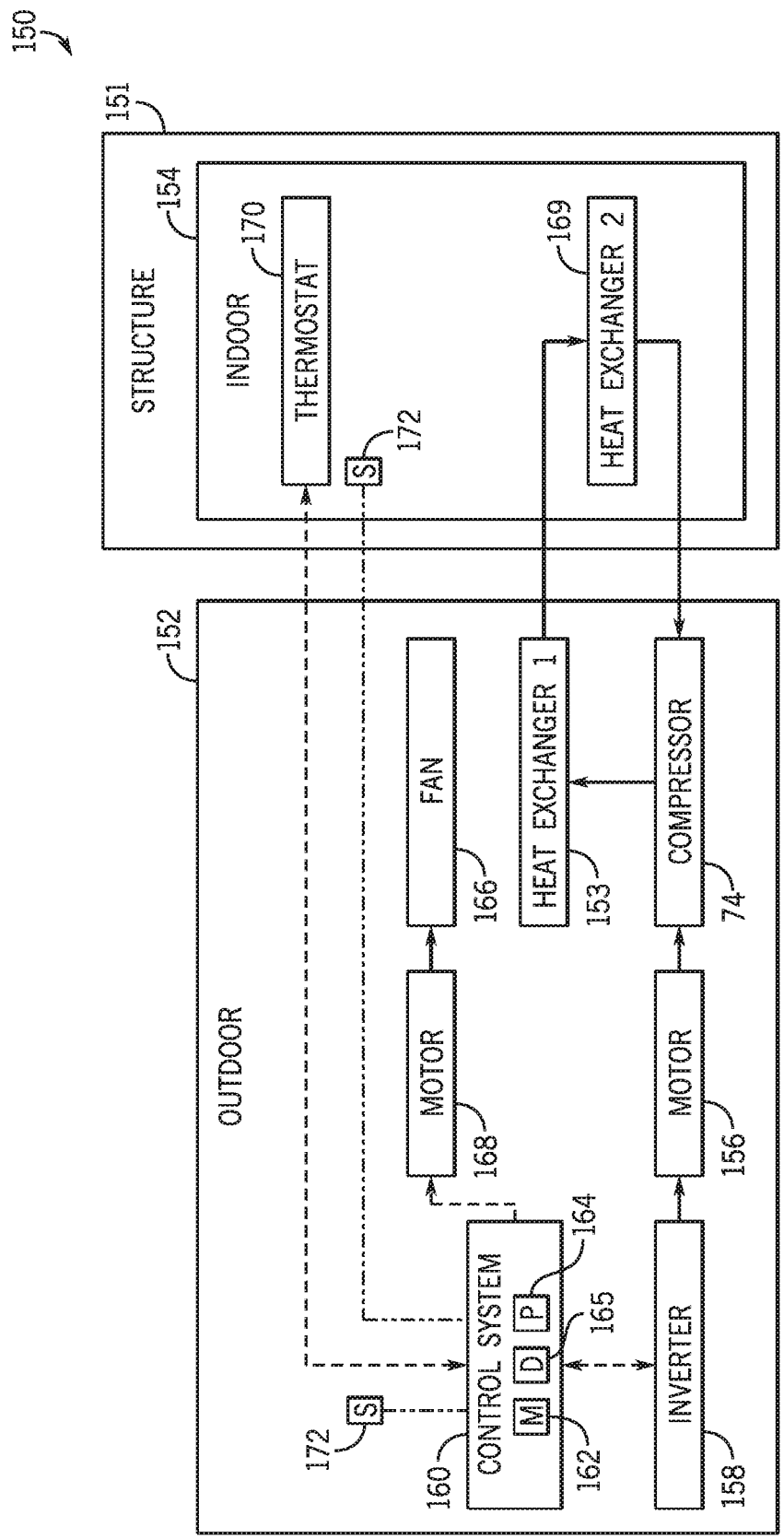
FIG. 5 is a schematic diagram of an embodiment of an HVAC system having an outdoor unit and an indoor unit, in accordance with an aspect of the present disclosure.

With this in mind, FIG. 5 is a schematic diagram of an embodiment of an HVAC system 150 having an outdoor unit or portion 152 and an indoor unit or portion 154. The outdoor unit 152 may include components of the HVAC system 150 positioned in an outdoor or ambient environment, and the indoor unit 154 may include components of the HVAC system 150 positioned within a structure 151, such as a building conditioned by the HVAC system 150. For example, the HVAC system 150 may be a split system similar to the residential heating and cooling system 50. However, in additional or alternative embodiments, the HVAC system 150 may be similar to the packaged HVAC unit 12 or any other suitable HVAC system.

In the illustrated embodiment, the outdoor unit 152 includes the compressor 74 and a first heat exchanger 153, which may be similar to the condenser 76. The outdoor unit 152 may also include a compressor motor 156, which drives the compressor 74 to pressurize refrigerant, and an inverter or inverter drive 158, which may be a different controller configured to control the operation of the compressor motor 156 to drive the operation of the compressor 74. Furthermore, the outdoor unit 152 may include a control system 160, such as an outdoor unit controller. The control system 160 may include a memory 162 and processor circuitry 164, such as a microprocessor. The memory 162 may include volatile memory, such as random-access memory (RAM), and/or non-volatile memory, such as read-only memory (ROM), optical drives, hard disc drives, solid-state drives, or any other non-transitory computer-readable medium that includes instructions to operate the HVAC system 150. The processor circuitry 164 may include one or more application specific integrated circuits (ASICs), one or more field programmable gate arrays (FPGAs), one or more general purpose processors, or any combination thereof, configured to execute the instructions stored in the memory 162 to operate the HVAC system 150. Furthermore, the control system 160 may include a display 165, which may display certain information associated with the HVAC system 150. Such information may include operational information of the HVAC system 150, information regarding the components of the HVAC system 150, or any other suitable information.

In one example, the control system 160 may be communicatively coupled to the inverter 158 and may cause the inverter 158 to operate the compressor motor 156 and the compressor 74 to operate in a desirable manner, such as at a particular speed. Additionally or alternatively, the control system 160 may be configured to operate a fan 166, such as an outdoor unit fan. The fan 166 may be configured to draw or force air across the first heat exchanger 153 to cool refrigerant flowing through the first heat exchanger 153. The control system 160 may be communicatively coupled to a fan motor 168 configured to operate, such as to rotate, the fan 166 to direct air across the first heat exchanger 153. In some embodiments, the fan motor 168 may be a variable speed motor, and the control system 160 may change the speed at which the fan motor 168 operates, thereby changing the flow rate of air directed across the first heat exchanger 153 and changing the cooling capacity provided by the fan 166. In addition, although the inverter 158 is communicatively coupled to the compressor motor 156 in the illustrated embodiment, the inverter 158 may additionally or alternatively be communicatively coupled to the fan motor 168 to drive operation of the fan 166.

The indoor unit 154 of the HVAC system 150 may include a second heat exchanger 169, which may be similar to the evaporator 80. In this way, refrigerant cooled by the first heat exchanger 153 may be directed to the second heat exchanger 169, where the cooled refrigerant may be used to cool an air flow. The cooled air flow may then be circulated through the structure 151 serviced by the HVAC system 150 to condition the structure 151. In certain embodiments, the indoor unit 154 may also include a thermostat 170, which may be used to adjust the operation of the HVAC system 150. For example, a user, such as a person in the structure 151, a technician of the HVAC system 150, or any other suitable user, may use the thermostat 170 to adjust the operation of the HVAC system 150. To this end, the thermostat 170 may include various features, such as a touchscreen, a knob, a button, a slider, a switch, a trackpad, and the like, with which the user may interact to adjust the operation of the HVAC system 150, for example, by adjusting an operating parameter of the HVAC system 150. The thermostat 170 may be communicatively coupled to the control system 160 and may transmit a user input indicative of the interaction between the user and the thermostat 170 to the control system 160. The control system 160 may then adjust the operation of the HVAC system 150, such as an operating parameter of the compressor 74 and/or the fan 166, based on the user input.

The HVAC system 150 may further include sensors 172 positioned at various locations, such as at the outdoor unit 152 and/or at the indoor unit 154. Each sensor 172 may be configured to monitor an operating parameter, such as a temperature of the structure 151, a temperature of an ambient environment, a parameter of the refrigerant circulated by the HVAC system, a speed of the fan 166, or other suitable operating parameter. Each sensor 172 may also be communicatively coupled to the control system 160 and may be configured to transmit sensor data indicative of the operating parameter to the control system 160. The control system 160 may then operate the HVAC system 150 based on the sensor data. Indeed, the control system 160 may operate the HVAC system 150 based on the user input received from the thermostat 170 and the sensor data received from the sensors 172. For instance, the user input and the sensor data may indicate that additional cooling is to be provided by the HVAC system 150, and the control system 160 may use the user input and the sensor data to adjust the operation of the compressor 74 and/or the fan 166 accordingly to provide the additional cooling.

In some implementations, the HVAC system 150 is a heat pump system that may operate between a cooling mode or a heating mode. In the cooling mode, in which the second heat exchanger 169 is used to cool the air flow, the first heat exchanger 153 may function as the condenser 76 and the second heat exchanger 169 may function as the evaporator 80 as described above. However, in the heating mode, the HVAC system 150 may heat the structure 151. As such, in the heating mode, the first heat exchanger 153 may function as the evaporator 80 to heat the refrigerant, and the control system 160 may not operate the fan 166 to avoid cooling the refrigerant in the first heat exchanger 153. Moreover, the second heat exchanger 169 may receive the heated refrigerant from the first heat exchanger 153. The second heat exchanger 169 may then heat the air flow via the heated refrigerant for heating the structure 151.

The HVAC system 150 may also be configured to operate in a defrost mode in which heated refrigerant is used to heat one of the heat exchangers 153, 169, for example, to mitigate formation of ice on the heat exchanger 153, 169. For instance, if a determination is made that the temperature of the first heat exchanger 153 is below a threshold temperature, such as caused by a low temperature of the ambient environment, the HVAC system 150 may operate in the defrost mode to increase the temperature of the first heat exchanger 153. As an example, during the defrost mode, the HVAC system 150 may execute a defrost cycle in which operation of the fan 166 is paused or suspended to avoid cooling the first heat exchanger 153. In addition, the compressor 74 may direct pressurized and heated refrigerant to the first heat exchanger 153 to heat the first heat exchanger 153, and the refrigerant may be directed from the first heat exchanger 153 to the second heat exchanger 169 and then back to the compressor 74. However, the second heat exchanger 169 may not condition an air flow via the refrigerant, or the rate at which the air flow is conditioned via the second heat exchanger 169 may be reduced in order to avoid cooling the structure 151. That is, in the defrost mode, the refrigerant may increase the temperature of the first heat exchanger 153 and limit the conditioning of the structure 151 as a result. In certain embodiments, there may be various types or configurations of defrost cycles that may be executed. Each type of defrost cycle may modify a different parameter, such as a flow rate of refrigerant, a pressurization of the refrigerant, and so forth, to change the heating capability of the refrigerant. For this reason, the HVAC system 150 may select a particular defrost cycle to be executed, such as based on a current temperature of one of the heat exchangers 153, 169, a target temperature of one of the heat exchangers 153, 169, a temperature of the ambient environment, and so forth. The HVAC system 150 may also execute multiple defrost cycles, including various types of defrost cycles, during operation in the defrost mode until a determination is made that the temperature of the first heat exchanger 153 is above the threshold temperature.

FIGS. 6-9 each illustrate a respective method or process for operating the HVAC system 150. In particular, each method depicted via FIGS. 6-9 may be performed in the event of an interruption in communication between the control system 160 and another component of the HVAC system 150. In certain embodiments, a single controller, such as the control system 160 and/or the inverter 158, may be configured to execute some or all illustrated steps of one of the methods. In additional or alternative embodiments, one controller may execute a portion of the steps of one of the methods, and one or more additional controllers may execute another portion of the steps. Furthermore, it should be noted that the steps of each method may be performed differently, such as for different embodiments of the HVAC system 150. By way of example, additional steps may be performed with respect to the steps depicted in FIGS. 6-9. Additionally or alternatively, certain steps described in FIGS. 6-9 may be removed, modified, and/or performed in a different order. Moreover, it should be noted that each of the methods presented in FIGS. 6-9 may be performed at the same time as one another or at different times, such as sequentially. Indeed, the steps for one of the methods may be performed in any suitable manner relative to performance of a step for another method.

Figure 6:
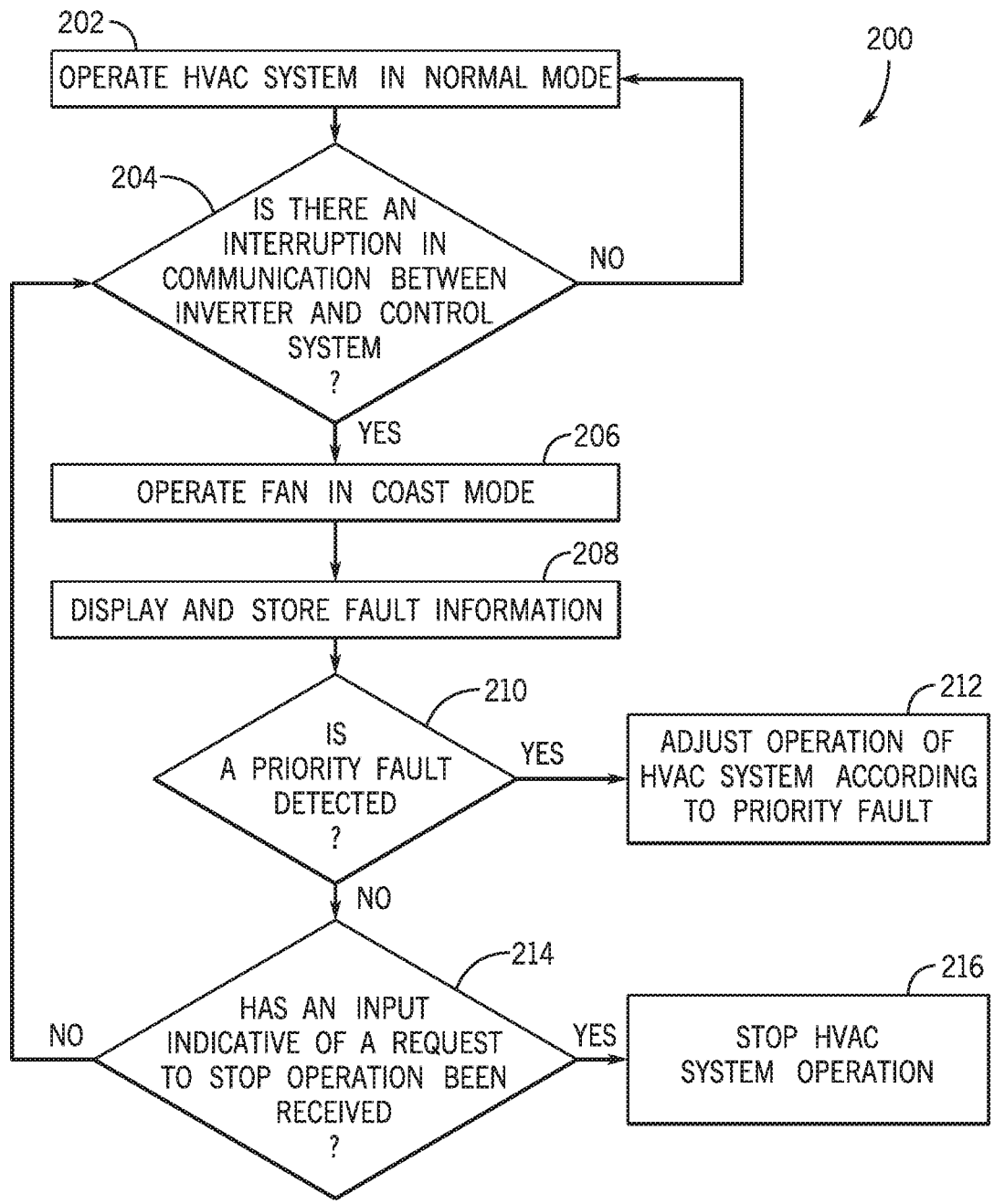
FIG. 6 is a flowchart of an embodiment of a method or process for operating an HVAC system when there is an interruption in communication between an inverter and an control system, in accordance with an aspect of the present disclosure.

FIG. 6 is a flowchart of an embodiment of a method or process 200 for operating the HVAC system 150 when there is a detected interruption in the communication between the inverter 158 and the control system 160. At block 202, the HVAC system 150 is operated in a normal mode. As used herein, a normal mode refers to an operation of the HVAC system 150 while the components of the HVAC system 150 are in communication with one another. For instance, during the normal mode, the control system 160 may cause the respective operating modes of the compressor motor 156 and/or of the fan motor 168 to change based on the user input received from the thermostat 170 and/or the sensor data received from the sensors 172.

At block 204, a determination is made regarding whether there is an interruption in the communication between the inverter 158 and the control system 160. As an example, the control system 160 may be configured to continuously receive communication signals from the inverter 158 during operation in the normal mode when there is an absence of interruption in the communication between the inverter 158 and the control system 160. However, if the control system 160 has not received a communication signal from the inverter 158 for a threshold time, then a determination is made, such as by the control system 160, that there is an interruption in the communication between the inverter 158 and the control system 160, such as an interruption in receiving communication signals from the inverter 158. For instance, the threshold time may be a previous 10 seconds, a previous 30 seconds, a previous minute, or any other suitable time interval. As another example, the control system 160 may be configured to continuously send communications signals to the inverter 158 in order to operate in the normal mode. However, if the control system 160 determines that a communication signal has not been successfully transmitted from the control system 160 to the inverter 158 for a threshold time, then a determination is made that there is an interruption in the communication between the inverter 158 and the control system 160.

In response to the determination that there is an interruption in the communication between the control system 160 and the inverter 158 of the compressor motor 156, the fan motor 168 and therefore the fan 166 may be operated in a coast mode (e.g., based on communication between the control system 160 and the fan motor 168), as indicated at block 206. As used herein, in the coast mode of the fan 166, the fan motor 168 is operated at a predetermined speed. In some embodiments, the current or most recent operating speed of the fan motor 168 may be detected or determined (e.g., via data transmitted by the sensor 172, via information stored in the memory 162), and the predetermined speed may be selected as the current or most recent operating speed of the fan motor 168. In this way, the HVAC system 150, and the fan motor 168 in particular, continues to operate in a current mode of operation. Although the present disclosure primarily discusses operating the fan motor 168 in the current or most recent operating speed, in additional or alternative embodiments, the fan motor 168 may operate at any suitable predetermined speed, such as a default or preset speed based on a detection of communication interruption between the inverter 158 and the control system 160. In other words, the fan motor 168 may be operated at a preselected or fixed predetermined speed in the coast mode regardless of the current or most recent operating speed of the fan motor 168.

Alternatively, if a determination is made that there is an interruption in the communication between the inverter 158 and the control system 160 while the HVAC system 150 is operating in a defrost mode, the HVAC system 150 may execute a predetermined defrost cycle, which may be a current type of defrost cycle, a most recently used type of defrost cycle, a preset type of defrost cycle, and the like. In this way, the HVAC system 150 may continue to operate in the defrost mode until a determination is made that the inverter 158 and the control system 160 are in communication with one another. Additionally or alternatively, while operating in the defrost mode after a determination is made that there is an interruption in the communication between the inverter 158 and the control system 160, the HVAC system 150 may receive a user input indicative of a request to operate in a different operating mode, and the HVAC system 150 may exit the defrost mode to operate in the heating or cooling mode in response to the user input.

At block 208, fault information associated with the interruption in the communication between the inverter 158 and the control system 160 is stored, such as in the memory 162. Such information may include a time at which the interruption was determined, a previous operating mode of the HVAC system 150, such as of the compressor motor 156 and/or of the fan motor 168, an operating parameter of the HVAC system 150, such as an ambient temperature, other suitable information, or any combination thereof. In this way, the fault information may be retrieved at a later time, such as by a technician performing maintenance on the HVAC system 150. Moreover, certain fault data and/or fault notification associated with the fault information may be presented, such as via the thermostat 170, via the display 165, and/or via a mobile or computing device communicatively coupled to the HVAC system 150. As such, the user may view the fault information and may adjust operation of the HVAC system 150 accordingly. In any case, after the fault information is stored, the HVAC system 150 may continue to operate in the current mode of operation, and additional faults may be monitored.

At block 210, a determination is made as to whether a priority fault has been detected. As used herein, a priority fault refers to a fault that is different from an interruption in communication between components of the HVAC system 150 and that would cause the operation of the HVAC system 150 to adjust so as to accommodate or address the priority fault. By way of example, the priority fault may include a low suction pressure of the compressor 74, a high discharge pressure of the compressor 74, a high pressure of the refrigerant, a low pressure of the refrigerant, a low power input, another suitable priority fault, or any combination thereof.

If a priority fault is detected, the operation of the HVAC system 150 may be adjusted, as shown at block 212. In an example, the speed of the fan motor 168 may be adjusted based on the priority fault. In another example, the HVAC system 150 may be locked out, and operation of the HVAC system 150 may be suspended or terminated based on the priority fault.

However, if a priority fault has not been detected, the HVAC system 150 may continue to operate in the current mode of operation, and a determination may be made as to whether an input indicative of a request to stop operation of the HVAC system 150 has been received, as indicated at block 214. In certain embodiments, the input may be a user input received via the thermostat 170. In this way, the user input may be a user request to stop operation of the HVAC system 150. In additional or alternative embodiments, the input may be automatically received, such as from the sensors 172. For instance, the HVAC system 150 may be scheduled to stop operation at a particular time, and the input may include sensor data indicative of the particular time or condition such that the HVAC system 150 may automatically stop operation without a user input. If an input indicative of a request to stop operation of the HVAC system 150 has not been received, the HVAC system 150 may continue to operate in the current mode of operation, during which priority faults and requests to stop operation may be continuously monitored.

Based on receipt of the request to stop operation of the HVAC system 150, the current mode of operation of the HVAC system 150 may be suspended or stopped, as shown at block 216. However, it should be noted that although the operation of the HVAC system 150 may be suspended upon receipt of the request to stop operation, in certain embodiments, the operation of the HVAC system 150 may not change operating modes in response to other requests. That is, for example, a user input indicative of a request to increase cooling of the structure 151 may be received. However, the HVAC system 150 may not change from the current mode of operation upon receipt of the request to increase cooling of the structure 151. In some implementations, after the operation of the HVAC system 150 has stopped, the operation of the HVAC system 150 may be re-initiated by a user input, such as via the thermostat 170. Additionally or alternatively, after the operation of the HVAC system 150 has stopped, the operation of the HVAC system 150 may be automatically re-initiated, such as based on another time or condition detected by the sensors 172. In certain embodiments, the operation of the HVAC system 150 may be re-initiated such that the fan 166 remains in the coast mode, such as if a determination is made that there is still an interruption in the communication between the inverter 158 and the control system 160. In additional or alternative embodiments, the HVAC system 150 may be re-initiated in the normal mode, such as if a determination is made that the inverter 158 is in communication with the control system 160.

Figure 7:
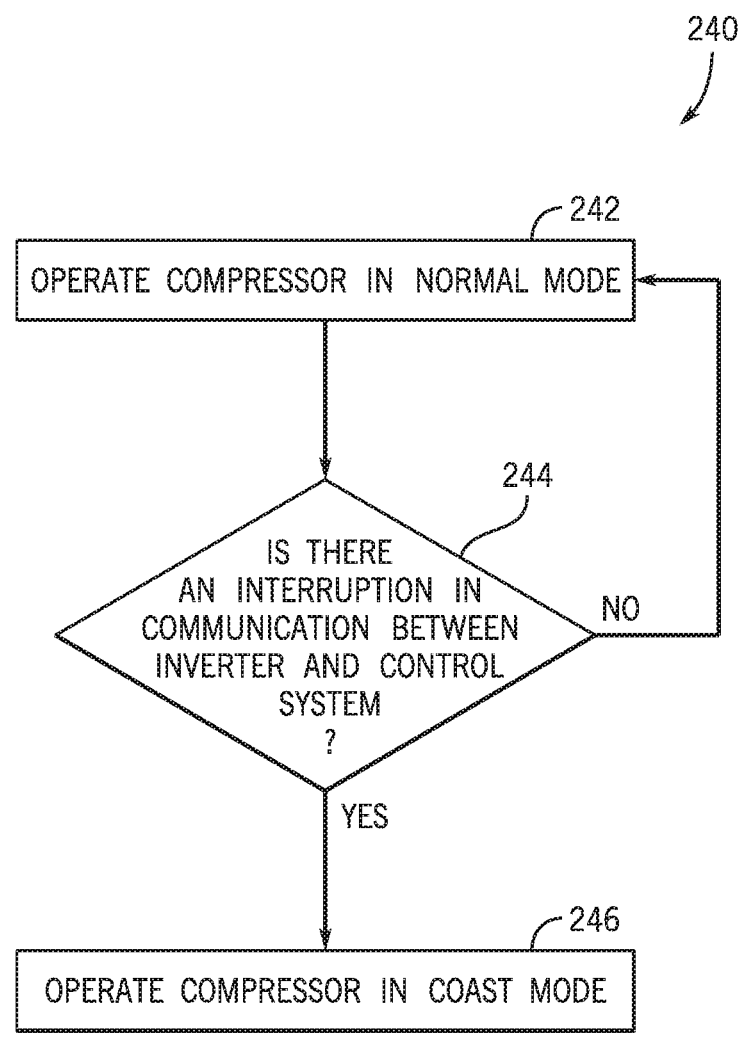
FIG. 7 is a flowchart of an embodiment of a method or process for operating a compressor when there is an interruption in communication between an inverter and a control system, in accordance with an aspect of the present disclosure.

FIG. 7 is a flowchart of an embodiment of a method or process 240 for operating the compressor motor 156 and therefore the compressor 74 when there is an interruption in the communication between the inverter 158 and the control system 160. For instance, the method 240 may be performed by the inverter 158, which may include a memory and processor circuitry separate from the memory 162 and the processor circuitry 164 of the control system 160. For this reason, the inverter 158 may also be able to determine the communication status with the control system 160. At block 242, the compressor motor 156 and therefore the compressor 74 are operated in a normal mode, which may be caused by communication signals transmitted by the control system 160, such as when the control system 160 is in communication with the inverter 158.

At block 244, a determination is made regarding whether there is an interruption in the communication between the inverter 158 and the control system 160. In an example, the inverter 158 may be configured to continuously transmit communication signals to the control system 160 in the normal mode. However, if the inverter 158 determines that a communication signal has not been successfully transmitted to the control system 160 within a threshold time, then a determination is made that there is an interruption in the communication between the inverter 158 and the control system 160. In another example, the inverter 158 may be configured to continuously receive communication signals from the control system 160 in the normal mode. However, if the inverter 158 determines that a communication signal has not been received from the control system 160 within a threshold time, then a determination is made that there is an interruption in the communication between the inverter 158 and the control system 160.

At block 246, in response to the determination that there is an interruption in the communication between the inverter 158 and the control system 160, the compressor motor 156 and therefore the compressor 74 may be operated in a coast mode. The coast mode refers to operation of the compressor motor 156 at a predetermined or predefined operating mode. The predetermined operating mode may be a current operating mode, a most recent operating mode, or another preset operating mode of the compressor motor 156. For instance, the predetermined operating mode may include operating the compressor 74 in a predetermined stage, a predetermined frequency, a predetermined speed, another suitable operating mode, or any combination thereof. In another embodiment, the predetermined mode may be an operating mode utilized by the HVAC system 150 at the time that the communication interruption is detected. In other words, when the inverter 158 detects that communication with the control system 160 is interrupted, the inverter 158 may continue to operate the compressor motor 156 in the same operating mode utilized at the time of detection. In this way, even though the inverter 158 and the control system 160 are not in communication with one another, the compressor 74 may continue to pressurize the refrigerant in order to cool the refrigerant in the first heat exchanger 153 such that the refrigerant may continue to condition an air flow.

FIG. 8 is a flowchart of an embodiment of a method or process 270 for operating the HVAC system 150 when there is an interruption in communication between the thermostat 170 and the control system 160. At block 202, the HVAC system 150 is operated in the normal mode described herein. At block 272, a determination is made regarding whether there is an interruption in the communication between the thermostat 170 and the control system 160. For instance, the control system 160 may be configured to continuously receive communication signals from the thermostat 170 in the normal mode when there is an absence in the interruption in the communication between the thermostat 170 and the control system 160. If the control system 160 has not received a communication signal from the thermostat 170 within a threshold time, such as a previous 30 seconds, then a determination is made that there is an interruption in the communication between the thermostat 170 and the control system 160. Additionally or alternatively, the control system 160 may be configured to continuously send communication signals to the thermostat 170 to operate in the normal mode. By way of example, the control system 160 may be configured to cause the thermostat 170 to output or display certain information, such as information regarding the operation of the HVAC system 150. However, if the control system 160 determines that a communication signal has not been successfully transmitted from the control system 160 to the thermostat 170 within a threshold time, then a determination is made that there is an interruption in the communication.

In response to the determination that there is an interruption in the communication between the thermostat 170 and the control system 160, the fan motor 168 and therefore the fan 166 may be operated in the coast mode described herein, as indicated at block 206. Furthermore, fault information or notifications, such as information associated with the interruption in the communication between the thermostat 170 and the control system 160, is stored, as shown at block 208. Additionally or alternatively, the fault information may be presented, such as via a visual and/or audio output. The fan 166 may then continue to operate in the coast mode such that the HVAC system 150 may continue to operate in the current mode or predetermined mode of operation after the fault information is stored.

Moreover, a time duration for which the HVAC system 150 operates in the current mode of operation may be monitored, such as via one of the sensors 172. In some embodiments, the time duration may be associated with a duration in which the HVAC system 150 has continuously operated in the current mode of operation. In additional or alternative embodiments, the time duration may be a total amount of time in which the HVAC system 150 has been operating in the current mode of operation over a certain time frame. At block 274, a determination is made regarding whether the monitored time duration has exceeded a threshold time, such as ten minutes, thirty minutes, on hour, or any suitable threshold time.

If a determination is made that the monitored time duration has not exceeded the threshold time, the occurrence of priority faults may be monitored, as shown at block 210. If an occurrence of a priority fault is detected, the operation of the HVAC system 150 may be adjusted accordingly as described herein and shown at block 212. If a priority fault has not been detected, the HVAC system 150 may continue to operate in the current mode or predetermined of operation, and the time duration and occurrence of a priority fault may continue to be monitored.

However, if a determination is made that the monitored time duration has exceeded the threshold time, the HVAC system 150 may be shut down, as shown at block 276. As an example, the HVAC system 150 may be configured to enter a soft lockout mode or soft shut down in which operation of the HVAC system 150, such as of the compressor 74 and/or of the fan 166, temporarily pauses. After a time interval, such as five minutes, ten minutes, or fifteen or more minutes, has passed while the HVAC system 150 is in the soft lockout mode, the operation of the HVAC system 150 may be automatically re-initiated in the normal mode. In certain implementations, the number of times in which the HVAC system 150 enters the soft lockout mode may be monitored to determine whether the HVAC system 150 should enter a hard lockout mode. In an example, if a determination is made that the quantity of instances in which the HVAC system 150 has entered the soft lockout mode is greater than a threshold number, such as three soft lockout modes, four soft lockout modes, or five or more soft lockout modes, within a time interval, such as ten hours, twenty hours, or thirty or more hours, the HVAC system 150 may enter the hard lockout. In another example, if a determination is made that the quantity of instances in which the HVAC system 150 has entered the soft lockout mode is greater than an overall threshold number, the HVAC system 150 may enter the hard lockout mode. In any case, after the HVAC system 150 has entered the hard lockout mode, operation of the components of the HVAC system 150, such as of the compressor 74 and/or of the fan 166, may be suspended until a user input has been received. For instance, the user input may include a user interaction, an adjustment of a component of the HVAC system 150, or any other suitable user input. In this way, a user may review the condition of the HVAC system 150, a technician may perform maintenance on the HVAC system 150, and the like, before the operation of the HVAC system 150 is re-initiated.

At block 278, a thermostat communication error protocol may be executed after the HVAC system 150 shuts down. The thermostat communication error protocol may include storing additional information regarding the fault condition associated with non-communication between the thermostat 170 and the control system 160, such as the monitored time duration in which the HVAC system 150 has been operating in the current mode or predetermined of operation. Additionally or alternatively, certain components of the HVAC system 150 may be adjusted to a predetermined state. For instance, although the HVAC system 150 may be locked out and the refrigerant is not circulated through the HVAC system 150, the position of certain valves may be set such that if the operation of the HVAC system 150 restarts, the refrigerant may be circulated in a predetermined or desirable manner. Thus, operation of the HVAC system 150 may be re-initiated in a desirable operating mode. Further, a certain notification may be presented to the user when the thermostat communication error protocol is executed. For instance, a notification may be sent to a mobile or computing device of the user of the HVAC system 150, a visual display, such as a light, may be output, a sound may be output, another notification may be presented, or any combination thereof, so as to inform the user of the non-communication between the thermostat 170 and the control system 160. As such, the user may then adjust operation of the HVAC system 150, such as to perform maintenance on the HVAC system 150, accordingly.

FIG. 9 is a flowchart of an embodiment of a method or process 300 for operating the compressor motor 156 and therefore the compressor 74 when there is an interruption in the communication between the thermostat 170 and the control system 160. The method 300 may be performed by the inverter 158. At block 242, the compressor motor 156 and the compressor 74 are operated in the normal mode based on communication signals transmitted from the control system 160 to the inverter 158. At block 302, a determination is made regarding whether there is an interruption in the communication between the thermostat 170 and the control system 160. For instance, the inverter 158 may receive a communication signal from the control system 160, and the communication signal may indicate whether the control system 160 communication signals have been successfully received from or sent to the thermostat 170 within a threshold time.

At block 304, in response to the determination that there is an interruption in the communication between the thermostat 170 and the control system 160, such as based on communication signals received by the control system 160 and/or communication signals by the thermostat 170, the compressor motor 156 and therefore the compressor 74 may be operated in the coast mode, which may include a current operating mode, a most recent operating mode, or another preset operating mode. For instance, the control system 160 may determine a current operating mode of the compressor 74. The control system 160 may also remain in communication with the inverter 158, and the inverter 158 may receive communication signals from the control system 160 instructing the inverter 158 to operate the compressor motor 156 in the coast mode, such as the operating mode utilized at the time of detecting the interruption in communication. As such, while the control system 160 is not in communication with the thermostat 170, the compressor 74 may continue to pressurize the refrigerant so as to cool the refrigerant in the first heat exchanger 153 such that the refrigerant may be used to condition an air flow.

In certain embodiments, the compressor motor 156 and therefore the compressor 74 may shut down while the thermostat 170 and the control system 160 are not in communication with one another. By way of example, as described with respect to block 276, the HVAC system 150 may shut down when the monitored time duration for communication interruption exceeds a threshold time. Thus, when the monitored time duration has exceeded the threshold time, operation of the compressor motor 156 may also be suspended or terminated. For instance, in response to a determination that the monitored time duration has exceeded the threshold time, the control system 160 may transmit communication signals to instruct the operation of the compressor motor 156 to be suspended. In this manner, the HVAC system 150 does not provide any conditioning capabilities when the monitored time duration exceeds the threshold time.

It should be noted that at any time, the HVAC system 150 may return to operating in the normal mode when the communication between the control system 160 and other components of the HVAC system 150 has been re-established and/or when there is no detected interruption in communication between components of the HVAC system 150. That is, for example, after a determination is made that the thermostat 170 and the control system 160 are in communication with one another again, the HVAC system 150 may return to operating in the normal mode, and operation of the fan 166 may be adjusted accordingly. However, in some embodiments, if a determination is made that there are still other priority faults when the communication between the control system 160 and other components of the HVAC system 150 has been re-established, the HVAC system 150 may remain locked out or the HVAC system 150 may not return to operating in the normal mode based on the priority fault.

The present disclosure may provide one or more technical effects useful in the operation of an HVAC system configured to condition an air flow. In some embodiments, the HVAC system may be configured to operate in a predetermined operating mode in response to a determination that certain components of the HVAC system are not in communication with one another. For example, a control system of the HVAC system may operate a fan motor at a particular operating speed based on an operating parameter received from a thermostat. After a determination is made that the control system is no longer in communication with the thermostat such that the control system may not set the operating speed of the fan motor based on the operating parameter received from the thermostat, the control system may instead operate the fan motor at a predetermined operating speed, such as a current operating speed or preselected operating speed. In this way, the fan motor remains in operation, and the HVAC system may continue to condition the air flow or otherwise operate when certain components are not in communication with one another. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) system, comprising:
 a compressor;
 a fan;
 an inverter configured to drive operation of the compressor; and
 a controller communicatively coupled to the fan and the inverter, wherein the controller comprises a tangible, non-transitory, computer-readable medium with computer-executable instructions that, when executed by processor circuitry, are configured to cause the processor circuitry to:
  determine an operating parameter of the fan in response to an interruption in receiving communication signals from the inverter; and
  operate the fan based on the operating parameter during the interruption.

2. The HVAC system of claim 1, wherein the operating parameter comprises a fan speed, and the computer-executable instructions, when executed by the processor circuitry, are configured to cause the processor circuitry to operate the fan at the fan speed.

3. The HVAC system of claim 2, wherein the controller is an outdoor unit controller, and the fan is an outdoor unit fan.

4. The HVAC system of claim 1, wherein the computer-executable instructions, when executed by the processor circuitry, are configured to cause the processor circuitry to:
 display a fault notification on a display of the controller in response to the interruption in receiving the communication signals from the inverter;
 store fault information in a memory device of the controller in response to the interruption in receiving the communication signals from the inverter; or
 both.

5. The HVAC system of claim 1, wherein the communication signals are first communication signals, and the computer-executable instructions, when executed by the processor circuitry, are configured to cause the processor circuitry to:
 receive second communication signals from a thermostat of the HVAC system, wherein the second communication signals comprise a request to stop operation of the HVAC system; and
 suspend operation of the fan based on receipt of the request to stop operation of the HVAC system.

6. The HVAC system of claim 1, wherein the computer-executable instructions, when executed by the processor circuitry, are configured to cause the processor circuitry to:
 execute a current defrost cycle of a defrost mode during the interruption; and
 suspend operation of the fan during the current defrost cycle and during the interruption.

7. The HVAC system of claim 1, wherein the computer-executable instructions, when executed by the processor circuitry, are configured to cause the processor circuitry to:
 detect a priority fault of the HVAC system during the interruption; and
 suspend operation of the fan in response to detection of the priority fault.

8. The HVAC system of claim 7, wherein the computer-executable instructions, when executed by the processor circuitry, are configured to cause the processor circuitry to operate the HVAC system in a soft lockout mode in response to the detection of the priority fault.

9. The HVAC system of claim 8, wherein the computer-executable instructions, when executed by the processor circuitry, are configured to cause the processor circuitry to:
 monitor a time duration in which the HVAC system is operating in the soft lockout mode; and
 adjust operation of the HVAC system from the soft lockout mode to a normal mode in response to a determination that the time duration has exceeded a threshold time.

10. The HVAC system of claim 8, wherein the computer-executable instructions, when executed by the processor circuitry, are configured to cause the processor circuitry to:
 determine a quantity of instances in which the HVAC system has entered the soft lockout mode over a time interval; and
 operate the HVAC system in a hard lockout mode in response to a determination that the quantity of instances has exceeded a threshold quantity.

11. The HVAC system of claim 10, wherein the computer-executable instructions, when executed by the processor circuitry, are configured to cause the processor circuitry to adjust operation of the HVAC system from the hard lockout mode to a normal mode in response to receiving a user input.

12. The HVAC system of claim 1, wherein the inverter is configured to drive operation of the compressor based on an additional operating parameter in response to an interruption in sending the communication signals to the controller.

13. The HVAC system of claim 12, wherein the additional operating parameter comprises a current operating mode of the compressor, a most recent operating mode of the compressor, or a preselected operating mode of the compressor.

14. A tangible, non-transitory, computer-readable medium with computer-executable instructions that, when executed by processor circuitry, are configured to cause the processor circuitry to:
 determine an operating parameter of a compressor and/or a fan of a heating, ventilation, and/or air conditioning (HVAC) system in response to an interruption in receiving communication signals from a thermostat of the HVAC system; and
 operate the compressor and/or the fan based on the operating parameter during the interruption.

15. The tangible, non-transitory, computer-readable medium of claim 14, wherein the operating parameter is a compressor speed of the compressor, and the computer-executable instructions, when executed by the processor circuitry, are configured to cause the processor circuitry to instruct the compressor to operate at the compressor speed.

16. The tangible, non-transitory, computer-readable medium of claim 14, wherein the computer-executable instructions, when executed by the processor circuitry, are configured to cause the processor circuitry to detect the interruption in receiving the communication signals in response to a determination that a communication signal of the communication signals has not been received from the thermostat within a threshold time.

17. The tangible, non-transitory, computer-readable medium of claim 14, wherein the computer-executable instructions, when executed by the processor circuitry, are configured to cause the processor circuitry to:
 monitor a time duration associated with the interruption; and operate the HVAC system in a soft lockout mode in response to a determination that the time duration has exceeded a threshold time.

18. The tangible, non-transitory, computer-readable medium of claim 14, wherein the operating parameter is a fan speed of the fan, and the computer-executable instructions, when executed by the processor circuitry, are configured to cause the processor circuitry to instruct the fan to operate at the fan speed.

19. The tangible, non-transitory, computer-readable medium of claim 14, wherein the computer-executable instructions, when executed by the processor circuitry, are configured to cause the processor circuitry to send a signal to an inverter of the HVAC system based on the operating parameter during the interruption, wherein the inverter is configured to drive operation of the compressor and/or the fan.

20. A non-transitory computer-readable medium comprising computer-executable instructions that, when executed by processor circuitry, are configured to cause the processor circuitry to:
   determine a first operating parameter of a fan of a heating, ventilation, and/or air conditioning (HVAC) system in response to a first interruption in receiving first communication signals from an inverter of the HVAC system, wherein the inverter is configured to drive operation of a compressor of the HVAC system;
   operate the fan based on the first operating parameter during the first interruption;
   determine a second operating parameter of the compressor and/or the fan in response to a second interruption in receiving second communication signals from a thermostat of the HVAC system; and
   operate the compressor and/or the fan based on the second operating parameter during the second interruption.

21. The non-transitory computer-readable medium of claim 20, wherein the first operating parameter is a current operating speed of the fan, a most recent operating speed of the fan, or a selected operating speed of the fan.

22. The non-transitory computer-readable medium of claim 20, wherein the second operating parameter is a current speed of the compressor, a most recent speed of the compressor, a preselected speed of the compressor, a current speed of the fan, a most recent speed of the fan, or a preselected speed of the fan.

23. The non-transitory computer-readable medium of claim 20, wherein the computer-executable instructions, when executed by the processor circuitry, are configured to cause the processor circuitry to operate the HVAC system in a normal mode based on an absence of the first interruption in receiving the first communication signals and the second interruption in receiving the second communication signals.

24. The non-transitory computer-readable medium of claim 20, wherein the computer-executable instructions, when executed by the processor circuitry, are configured to cause the processor circuitry to:
   determine whether there is an occurrence of a priority fault of the HVAC system during the first interruption, the second interruption, or both; and
   suspend operation of the fan, the compressor, or both, based on a determination of the occurrence of the priority fault.

25. The non-transitory computer-readable medium of claim 20, wherein the computer-executable instructions, when executed by the processor circuitry, are configured to cause the processor circuitry to:
   output a first fault notification, store first fault information, or both, in response to the first interruption; and
   output a second fault notification, store second fault information, or both, in response to the second interruption.

* * * * *